(12) United States Patent
Nammi et al.

(10) Patent No.: US 10,334,533 B2
(45) Date of Patent: Jun. 25, 2019

(54) NON-ORTHOGONAL DESIGN FOR CHANNEL STATE INFORMATION REFERENCE SIGNALS FOR A 5G AIR INTERFACE OR OTHER NEXT GENERATION NETWORK INTERFACES

(71) Applicant: AT&T Intellectual Property I, L.P., Atlanta, GA (US)

(72) Inventors: SaiRamesh Nammi, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 135 days.

(21) Appl. No.: 15/341,927

(22) Filed: Nov. 2, 2016

(65) Prior Publication Data
US 2018/0123848 A1 May 3, 2018

(51) Int. Cl.
*H04W 52/14* (2009.01)
*H04L 27/26* (2006.01)
(Continued)

(52) U.S. Cl.
CPC ........ *H04W 52/143* (2013.01); *H04B 7/0626* (2013.01); *H04L 1/0026* (2013.01);
(Continued)

(58) Field of Classification Search
CPC combination set(s) only.
See application file for complete search history.

(56) References Cited

U.S. PATENT DOCUMENTS 5,802,117 A 9/1998 Ghosh
6,985,531 B2 1/2006 McCarty, Jr.
(Continued)

FOREIGN PATENT DOCUMENTS

CN 103098399 A 5/2013
EP 1 983 653 A1 10/2008
(Continued)

OTHER PUBLICATIONS

Non-Final Office Action received for U.S. Appl. No. 15/401,083 dated Apr. 16, 2018, 208 Pages.
(Continued)

*Primary Examiner* — Xavier Szewai Wong
(74) *Attorney, Agent, or Firm* — Amin, Turocy & Watson, LLP

(57) ABSTRACT

Channel state information reference signal transmission can be used to estimate channel state information. Although resources needed for channel state information reference signals can be small, when multiple bandwidths are deployed within the same orthogonal frequency division multiplexing bandwidth, estimating the channel state information can comprise a channel state information reference signal resource grid for every bandwidth. Therefore, time-frequency resources for channel state information reference signals can be high and occupy a lot of bandwidth, thereby reducing the number of resources for data transmission. Therefore, a non-orthogonal design for channel state information reference signals for a 5G air interface can mitigate bandwidth loss in a 5G network.

20 Claims, 12 Drawing Sheets

(51) Int. Cl.
*H04L 1/00* (2006.01)
*H04B 7/06* (2006.01)
*H04L 5/00* (2006.01)

(52) U.S. Cl.
CPC ........ *H04L 27/2646* (2013.01); *H04L 5/0051* (2013.01); *H04L 5/0053* (2013.01)

(56) References Cited

U.S. PATENT DOCUMENTS

| | | | |
|---|---|---|---|
| 6,993,294 B2 | 1/2006 | Nobukiyo et al. | |
| 7,088,782 B2 | 8/2006 | Mody et al. | |
| 7,359,311 B1 | 4/2008 | Paranjpe et al. | |
| 7,386,306 B2 | 6/2008 | Loroia et al. | |
| 7,450,548 B2 | 11/2008 | Haustein et al. | |
| 7,499,515 B1 | 3/2009 | Beadle | |
| 7,567,502 B2 | 7/2009 | Loroia et al. | |
| 7,633,924 B2 | 12/2009 | Fujii et al. | |
| 7,706,458 B2 | 4/2010 | Mody et al. | |
| 7,787,358 B2 | 8/2010 | Wilhelmsson et al. | |
| 7,813,371 B2 | 10/2010 | McNew et al. | |
| 7,826,541 B2 | 11/2010 | Fujii et al. | |
| 7,885,214 B2 | 2/2011 | Ahmadi et al. | |
| 8,018,855 B2 | 9/2011 | Englund et al. | |
| 8,077,595 B2 | 12/2011 | Bhushan et al. | |
| 8,159,979 B2 | 4/2012 | Lee et al. | |
| 8,223,737 B2 | 7/2012 | Nangia et al. | |
| 8,259,695 B2 | 9/2012 | Lee et al. | |
| 8,259,828 B2 | 9/2012 | Fu et al. | |
| 8,369,468 B2 | 2/2013 | da Silva et al. | |
| 8,400,939 B2 | 3/2013 | Kim et al. | |
| 8,576,936 B2 | 11/2013 | Ericson et al. | |
| 8,605,687 B2 | 12/2013 | Barak et al. | |
| 8,634,334 B2 | 1/2014 | Ahmadi | |
| 8,634,363 B2 | 1/2014 | Kim et al. | |
| 8,780,941 B2 | 7/2014 | Dor et al. | |
| 8,842,628 B2 | 9/2014 | Gao et al. | |
| 8,913,479 B2 | 12/2014 | Bhushan et al. | |
| 8,917,686 B2 | 12/2014 | Lee et al. | |
| 8,953,615 B2 | 2/2015 | Cai et al. | |
| 8,989,208 B2 | 3/2015 | Chen et al. | |
| 9,036,520 B2 * | 5/2015 | Montojo | H04L 1/0017 370/311 |
| 9,065,586 B2 | 6/2015 | Jacob et al. | |
| 9,094,966 B2 | 7/2015 | Kim et al. | |
| 9,100,093 B2 | 8/2015 | Branlund et al. | |
| 9,100,870 B2 | 8/2015 | Yang et al. | |
| 9,148,256 B2 | 9/2015 | Sampath et al. | |
| 9,160,439 B2 | 10/2015 | Li | |
| 9,210,712 B2 | 12/2015 | Hwang et al. | |
| 9,264,249 B2 | 2/2016 | Zhang et al. | |
| 9,300,424 B2 | 3/2016 | Seo et al. | |
| 9,351,293 B2 | 5/2016 | Chen et al. | |
| 9,439,135 B2 | 9/2016 | Ahn et al. | |
| 9,444,535 B2 | 9/2016 | Dinan | |
| 9,479,300 B2 | 10/2016 | Kim et al. | |
| 9,509,464 B2 | 11/2016 | Cai et al. | |
| 9,516,644 B2 * | 12/2016 | Pan | H04L 5/0048 |
| 9,531,521 B2 | 12/2016 | Ng | |
| 9,717,086 B2 | 7/2017 | Zhang et al. | |
| 9,820,281 B1 | 11/2017 | Werner et al. | |
| 2002/0181509 A1 | 12/2002 | Mody et al. | |
| 2003/0016622 A1 | 1/2003 | McCarty, Jr. | |
| 2005/0190822 A1 | 9/2005 | Fujii et al. | |
| 2005/0233752 A1 | 10/2005 | Loroia et al. | |
| 2006/0239370 A1 | 10/2006 | Mody et al. | |
| 2008/0165866 A1 | 7/2008 | Teo et al. | |
| 2009/0022050 A1 | 1/2009 | Ohta | |
| 2009/0202010 A1 | 8/2009 | Fu et al. | |
| 2011/0103243 A1 | 5/2011 | Larsson et al. | |
| 2011/0182332 A1 | 7/2011 | Ericson et al. | |
| 2011/0269442 A1 | 11/2011 | Han et al. | |
| 2012/0307706 A1* | 12/2012 | Nakano | H04J 11/0033 370/312 |
| 2013/0028150 A1 | 1/2013 | Ma et al. | |
| 2013/0170464 A1 | 7/2013 | Hwang et al. | |
| 2013/0194931 A1 | 8/2013 | Lee et al. | |
| 2013/0295925 A1 | 11/2013 | Jacob et al. | |
| 2014/0044040 A1 | 2/2014 | Chen et al. | |
| 2014/0086188 A1 | 3/2014 | Hoymann et al. | |
| 2014/0126485 A1 | 5/2014 | Chen et al. | |
| 2014/0177457 A1 | 6/2014 | Grosspietsch et al. | |
| 2014/0179363 A1* | 6/2014 | Nishikawa | H04L 27/2614 455/522 |
| 2014/0341051 A1* | 11/2014 | Gaal | H04W 24/10 370/252 |
| 2015/0029875 A1* | 1/2015 | Zhu | H04W 4/70 370/252 |
| 2015/0131560 A1 | 5/2015 | Von Elbwart et al. | |
| 2015/0131756 A1 | 5/2015 | Suh et al. | |
| 2015/0146653 A1 | 5/2015 | Zhang et al. | |
| 2015/0180622 A1 | 6/2015 | Yoo et al. | |
| 2015/0200755 A1 | 7/2015 | Hammarwall et al. | |
| 2015/0223245 A1 | 8/2015 | Cheng et al. | |
| 2015/0257139 A1 | 9/2015 | Chen et al. | |
| 2015/0288475 A1 | 10/2015 | Tabet et al. | |
| 2015/0312927 A1 | 10/2015 | Ko et al. | |
| 2015/0349987 A1 | 12/2015 | Soriaga et al. | |
| 2015/0372851 A1 | 12/2015 | Kakishima et al. | |
| 2016/0006487 A1 | 1/2016 | Ding et al. | |
| 2016/0143055 A1* | 5/2016 | Nammi | H04W 74/006 370/329 |
| 2016/0156397 A1 | 6/2016 | Onggosanusi et al. | |
| 2016/0156401 A1 | 6/2016 | Onggosanusi et al. | |
| 2016/0182134 A1 | 6/2016 | Kol et al. | |
| 2016/0248555 A1 | 8/2016 | Lei et al. | |
| 2016/0255611 A1 | 9/2016 | Damnjanovic et al. | |
| 2016/0294531 A1 | 10/2016 | Loehr et al. | |
| 2016/0337056 A1* | 11/2016 | Frenne | H04B 7/0695 |
| 2016/0352551 A1 | 12/2016 | Zhang et al. | |
| 2016/0373195 A1* | 12/2016 | Kato | H04W 16/32 |
| 2017/0099126 A1 | 4/2017 | Yoo et al. | |
| 2017/0118055 A1 | 4/2017 | Guey et al. | |
| 2017/0134199 A1 | 5/2017 | Wang et al. | |
| 2017/0215170 A1 | 7/2017 | Islam et al. | |
| 2017/0325250 A1 | 11/2017 | Manolakos et al. | |
| 2017/0332378 A1 | 11/2017 | Werner et al. | |
| 2018/0049047 A1 | 2/2018 | Lin et al. | |
| 2018/0049222 A1 | 2/2018 | Manolakos et al. | |
| 2018/0092002 A1 | 3/2018 | Manolakos et al. | |
| 2018/0098312 A1* | 4/2018 | Lin | H04L 1/1861 |
| 2018/0109406 A1 | 4/2018 | Wang et al. | |

FOREIGN PATENT DOCUMENTS

| | | |
|---|---|---|
| EP | 2 618 504 A2 | 7/2013 |
| EP | 2771999 A2 | 9/2014 |
| JP | 09284200 A | 10/1997 |
| JP | 2010178237 A | 8/2010 |
| KR | 10-2012-0028203 A | 3/2012 |
| KR | 20120061881 A | 6/2012 |
| KR | 10-1480531 B1 | 1/2015 |
| KR | 101617348 B1 | 5/2016 |
| RU | 2530749 C2 | 10/2014 |
| RU | 2545527 C2 | 4/2015 |
| WO | 2009052420 A2 | 4/2009 |
| WO | 2010138921 A2 | 12/2010 |
| WO | 2012/036439 A2 | 3/2012 |
| WO | 2012041016 A2 | 4/2012 |
| WO | 2012/036439 A3 | 5/2012 |
| WO | 2013135140 A1 | 9/2013 |
| WO | 2014021986 A1 | 2/2014 |
| WO | 2014107904 A1 | 7/2014 |
| WO | 2016066231 A1 | 5/2016 |
| WO | 2016/099830 A1 | 6/2016 |
| WO | 2016123393 A1 | 8/2016 |
| WO | 2016130175 A1 | 8/2016 |
| WO | 2016146165 A1 | 9/2016 |

(56) References Cited

FOREIGN PATENT DOCUMENTS

WO 2016153548 A1 9/2016
WO 2016172652 A1 10/2016

OTHER PUBLICATIONS

Non-Final Office Action received for U.S. Appl. No. 15/400,379 dated Jun. 29, 2018, 40 Pages.

"5G Waveform & Multiple Access Techniques," Nov. 2015, Qualcomm Technologies, Inc., 46 pages. http://www.ee.iitm.ac.in/~giri/pdfs/EE5141/Qualcomm-5g-Waveforms.pdf.

Agyapong et al., "Design Considerations for a 5G Network Architecture," IEEE Communications Magazine, 2014, pp. 65-75, vol. 52, No. 11, 19 pages. https://pdfs.semanticscholar.org/cf82/05dddcf91b86814a18e6859b4d894f6b482c.pdf.

Levanen et al., "Radio Interface Evolution Towards 5G and Enhanced Local Area Communications," IEEE Access Journals & Magazines, 2014, vol. 2, pp. 1005 1029, 25 pages. http://ieeexplore.ieee.org/stamp/stamp.jsp?tp=&arnumber=6891105.

Mogensen et al., "5G Small Cell Optimized Radio Design," Globecom, IEEE Conference and Exhibition, 2013, 7 pages. https://pdfs.semanticscholar.org/ef23/9f901429824d81c5572c4fad9977c8eb26d9.pdf.

Pitaval et al., "Spectrally-Precoded OFDM for 5G Wideband Operation in Fragmented sub-6GHz Spectrum," 2016, 12 pages. https://arxiv.org/ftp/arxiv/papers/1606/1606.00623.pdf.

Rajagopal et al., "Multi-User MIMO with Flexible Numerology for 5G," 2016, 6 pages. https://arxiv.org/ftp/arxiv/papers/1610/1610.03056.pdf.

"OFDM Systems Why Cyclic Prefix?" Feb. 2008, 4 pages. http://sites.google.com/site/mdanishnisar/pubs/01_OFDM_Tutorial_Nisar.pdf.

Luo et al., "Millimetre-Wave Air-Interface for 5G Challenges and Design Principles," ETSI Workshop of Future Radio Technologies—Air Interfaces, Jan. 2016, 10 pages. https://docbox.etsi.org/Workshop/2016/201601_FUTURERADIOTECHNOL_WORKSHOP/S04_NEW_RADIO_ACCESS_TECHNO_SERV_ENVIR_PART_1/mmMAGIC_CHALLENGES_DESIGN_PRINCIP_paper.pdf.

Simsek et al., "5G-Enabled Tactile Internet," IEEE Journal on Selected Areas in Communications, Mar. 2016, pp. 460-473, vol. 34, No. 3. 14 pages. https://www.researchgate.net/profile/Adnan_Aijaz/publication/294108489_5GEnabled_Tactile_Internet/links/572a56f908aef5d48d30cc16.pdf.

Popovski et al., "Mobile and Wireless Communications Enablers for the Twenty-Twenty Information Society (METIS)," Proposed Solutions for New Radio Access, Document No. ICT-317669-METIS/D2.4, 2015, 190 pages. http://publications.lib.chalmers.se/records/fulltext/220587/local_220587.pdf.

Wild et al., "A Reduced Complexity Transmitter for UF OFDM," IEEE 81st Vehicular Technology Conference (VTC—Spring), 2015, IEEE, 6 pages. https://www.researchgate.net/publication/276419672_A_reduced_complexity_transmitter_for_UF-OFDM.

Non-Final Office Action received for U.S. Appl. No. 15/401,083 dated Oct. 10, 2018, 46 pages.

Notice of Allowance received for U.S. Appl. No. 15/401,083 dated Jan. 28, 2019, 24 pages.

* cited by examiner

NON-ORTHOGONAL DESIGN FOR CHANNEL STATE INFORMATION REFERENCE SIGNALS FOR A 5G AIR INTERFACE OR OTHER NEXT GENERATION NETWORK INTERFACES

TECHNICAL FIELD

This disclosure relates generally to facilitating a non-orthogonal design for channel state information. For example, this disclosure relates to facilitating a non-orthogonal design for channel state information reference signals for a 5G, or other next generation network, air interface.

BACKGROUND

5th generation (5G) wireless systems represent a next major phase of mobile telecommunications standards beyond the current telecommunications standards of 4$^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to a non-orthogonal design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
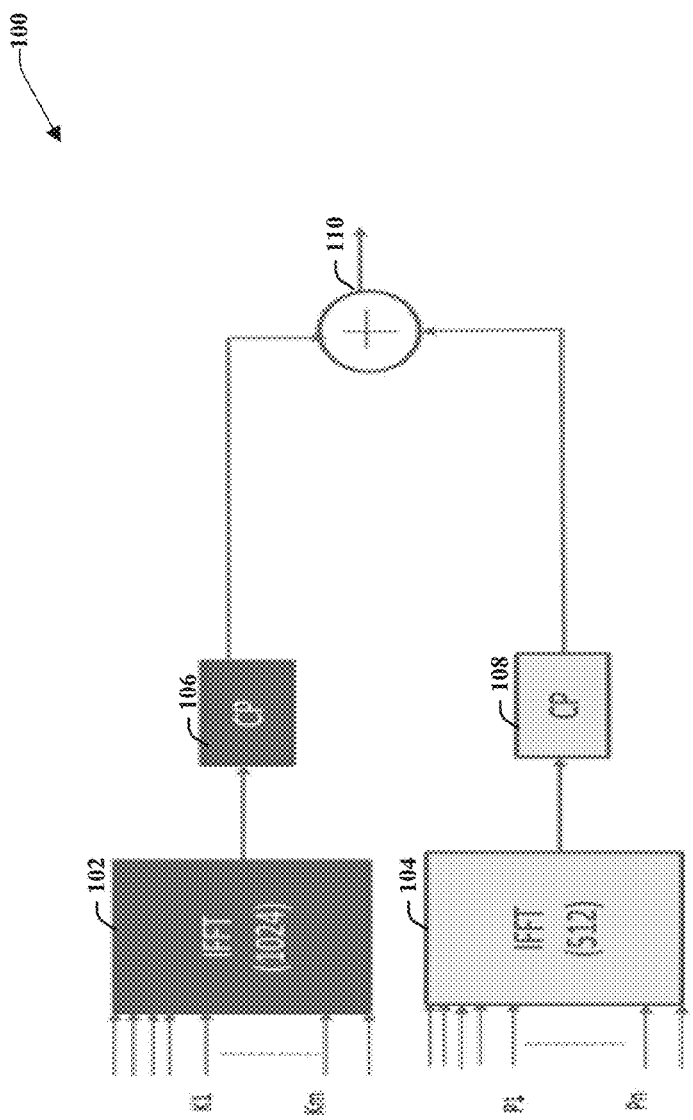
FIG. 1 illustrates an example schematic system block diagram of cyclic prefix orthogonal frequency-division multiplexing with mixed numerology according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a non-orthogonal design for channel state information reference signals for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a generic channel state information framework design for a 5G network. Facilitating a non-orthogonal design for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called as New Radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., sub-carrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource element within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

CSI-RS signal transmission is important for estimating the CSI. Although resources needed for CSI-RS can be small, when multiple numerologies are deployed within the same OFDM bandwidth, using a conventional approach (as in LTE), estimating the CSI can comprise a CSI-RS resource grid for every numerology. Therefore, time-frequency resources for CSI-RS can be high and occupy a lot of bandwidth, thereby reducing the number of resources for data transmission. Therefore, significant loss in data throughput can limit the system capacity. Hence, a solution is needed for efficient use of CSI-RS resources for serving all numerologies.

This disclosure comprises several solutions for allocating the CSI-RS resources when multiple numerologies are deployed. Additionally, this disclosure comprises methods, at the receiver, for estimating the channel from CSI-RS when multiple numerologies are deployed. With the proposed schemes, fewer resources for CSI-RS transmission are needed, thereby allocating more resources for data channels. Hence, significant gains in sector throughput and link throughput can be obtained.

The proposed solutions can be divided into two categories. The first category can comprise the CSI-RS and underlying PDSCH comprising the same numerology. The second category can comprise the PDSCH and the CSI-RS having different numerology.

With regards to the first category, the underlying PDSCH can be rate matched around the CSI-RS. For a mixed numerology case, the rate matching can be in-efficient and depend on the numerology mix. Rate matching in PDSCH is a block in baseband processing. The basic function of a rate matching module is to match the number of bits in a transport block (TB) to the number of bits that can be transmitted in the given allocation. Rate matching can comprise sub-block interleaving, bit collection, and pruning. In PDSCH, rate matching can be performed by the PDSCH TB being segmented into code blocks (CB) if its size is greater than 6144 bits. Otherwise there can be no segmentation of the TB, but the TB and CB can be of same size. Rate matching can be performed over code blocks and performed after the code blocks have undergone turbo encoding. The turbo encoder can perform a 1/3 rate encoding. For example, for every single input bit, 3 output bits can be provided in which the first bit is the original input bit called as a systematic bit, and the remaining two bits can be an interleaved version of the input bit called parity 1 and parity 2 bits. These three streams of systematic, parity 1, and parity 2 bits can be fed as input to a rate matching module.

In this case, the PDSCH can be rate matched around the CSI-RS resources. For example, consider the scenario of 15 KHz and 30 KHz mixing. If 2 resource elements are allocated for CSI-RS transmission, then for the PDSCH transmission for 15 KHz sub carrier spacing, rate matching can be performed as in legacy systems (LTE). For PDSCH transmission of 60 KHz spacing, rate matching can be performed around 1 resource element as the sub carrier spacing is 2 times that of the CSI-RS.

With regards to the second category, the underlying PDSCH cannot be rate matched around the CSI-RS. Hence, the PDSCH transmitted can be multiplexed with the CSI-RS of the other numerology. For example, the scenario of 15 KHZ and 60 KHZ mixing can comprise two resource elements allocated for CSI-RS transmission. Then, for the PDSCH transmission for 15 KHz sub carrier spacing, a multiplex of 2*(60/15) can equal 8 resource elements. Hence, significant gains can be expected for higher numerology with the proposed scheme. Note that the above scheme assumes that the underlying receiver can cancel the CSI-RS interference due to a 15 KHz spacing carrier. Also note that since CSI-RS and PDSCH are multiplexed, additional CSI-RS resources can be used for better channel estimation. The above technique can be extended by varying (reducing/increasing) the power of CSI-RS of the higher numerology carrier and using higher density of CSI-RS resources. Consequently, the receiver does not require cancelling of the CSI-RS of the other numerology.

The UE can estimate the channel from the CSI-RS and also detect data when the CSI-RS is multiplexed with the data channel. For channel estimation at the receiver side, the UE can leverage the following equations. The received signal for the $K^{th}$ subcarrier can be written as:

$$y(k)=H(k)x(k)+n, \quad \text{Equation (1)}$$

where: Y(k) is a received complex symbol value, X(k) is a transmitted complex symbol value, H(k) is a complex channel gain experienced by a symbol, and N is the complex noise and interference caused by the other numerology.

Since CSI-RS can carry the known pilot symbols at the transmitter and at the receiver, the channel estimate can be given by He(k) and computed based on either least squares, MMSE, or another estimation technique. For example, using least squares can compute:

$$He(k)=y^h(k)x^h(k) \quad \text{Equation (2)}$$

For data estimation for the numerologies, which are different compared to the CSI-RS numerology, the received signal for the $j^{th}$ subcarrier can be written as:

$$y(j)=H(j)x(j)+Hr(j)xr(j)+n \quad \text{Equation (3)}$$

where, Y(j) is a received complex symbol value, X(j) is a transmitted complex symbol value, H(j) is a complex channel gain experienced by a symbol, Hr(j) is a complex channel gain experienced by a symbol in the CSI-RS numerology, Xr(j) is the CSI-RS transmitted symbol, and N is the complex noise. Since the receiver can estimate the channel, the receiver can subtract the contribution due to CSI-RS in this numerology.

Hence, after subtraction the received signal can be given by:

$$y(j)-Hr(j)xr(j)=H(j)x(j)+n \quad \text{Equation (3)}$$

Once the component due to CSI-RS is subtracted from the received signal, conventional detection techniques can be used to detect the data in the other numerology.

In one embodiment, described herein is a method comprising transmitting a reference signal associated with a mobile device to the mobile device, wherein the network device is one of network devices of a wireless network. In response to the transmitting the reference signal, the method can comprise receiving, from the mobile device, a channel state reference signal. The method can also determine a downlink transmission parameter based on the channel state reference signal. The method can also multiplex a first bandwidth associated with the wireless network with a second bandwidth associated with the channel state reference signal. In response to the multiplexing, the method can transmit the downlink transmission parameter via a downlink control channel of the wireless network for application to downlink transmissions of the wireless network at element. After the transmitting the downlink transmission parameter, the method can facilitate transmitting data via a data traffic channel of the wireless network.

According to another embodiment, a system can facilitate, the transmitting a reference signal related to a mobile device to the mobile device via a network device of network devices of a wireless network. In response to the transmitting of the reference signal, the system can receive channel state data, via a feedback channel, from the mobile device via the network device. The system can also determine a downlink transmission parameter based on the channel state data, and transmit the downlink transmission parameter via a downlink control channel of the wireless network for application to downlink transmissions of the wireless network. Consequently, in response to the transmitting of the downlink transmission parameter, the system can transmit data via a data traffic channel of the wireless network.

According to yet another embodiment, described herein is a machine-readable storage medium that can perform the operations comprising sending a reference signal associated with a mobile device to the mobile device. In response to the sending the reference signal, the machine-readable storage medium can receive channel state data, via a feedback channel, from the mobile device. Based on the channel state data, the machine-readable storage medium can determine a downlink transmission parameter, transmit the downlink transmission parameter via a downlink control channel. In response to the transmitting the downlink transmission parameter, the machine-readable storage medium can transmit data via a data traffic channel.

These and other embodiments or implementations are described in more detail below with reference to the drawings.

Referring now to FIG. 1, illustrated is an example schematic system block diagram of cyclic prefix orthogonal frequency-division multiplexing with mixed numerology according to one or more embodiments. As an example of multiple numerology, FIG. 1 depicts the block diagram of the CP-OFDM transmitter in the mixed numerology case 100. The upper branch 102 uses numerology with subcarrier spacing of 15 KHz spacing, while the lower branch 104 uses subcarrier spacing of 30 KHz. The lower branch 104 can generate two OFDM symbols during the time the upper branch 102 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 4, below, between the numerologies. Therefore, if G is the number of guard tones between these two numerologies, then:

$$P_1 = \frac{K_M}{2} + G, \quad \text{Equation (4)}$$

cyclic-prefixes 106, 108 can be used to mitigate interference introduced by the upper branch 102 and the lower branch 104, respectively. Additionally, a summation block 110 can be used to apply the guard tones to assist in interference reduction.

Figure 2:
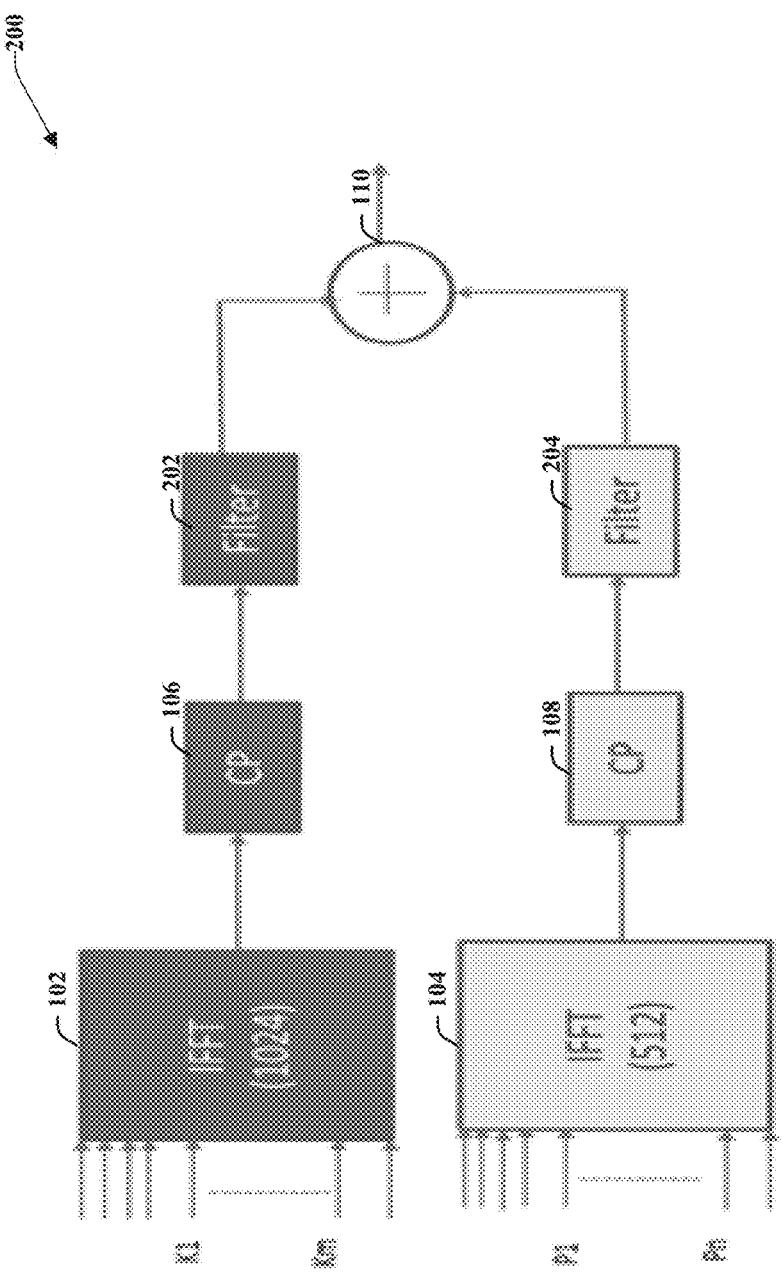
FIG. 2 illustrates an example schematic system block diagram of filtered orthogonal frequency-division multiplexing with mixed numerology according to one or more embodiments.

Referring now to FIG. 2, illustrated is an example schematic system block diagram of filtered orthogonal frequency-division multiplexing with mixed numerology according to one or more embodiments. FIG. 2 depicts the block diagram for a filtered OFDM with mixed numerology 200. The upper branch 102 uses numerology with subcarrier spacing of 15 KHz spacing, while the lower branch 104 uses subcarrier spacing of 30 KHz. The lower branch 104 can generate two OFDM symbols during the time the upper branch 102 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 4, between the numerologies. Therefore, if G is the number of guard tones between these two numerologies, then cyclic-prefixes 106, 108 can be used to mitigate interference introduced by the upper branch 102 and the lower branch 104, respectively. Furthermore, each branch can leverage a transmission filter 202, 204 to minimize interference. The transmission filters 202, 204 can reduce certain aspects of the signals received from the cyclic-prefixes 106, 108, namely signal interference. Additionally, a summation block 110 can be used to apply the guard tones to assist in interference reduction.

Figure 3:
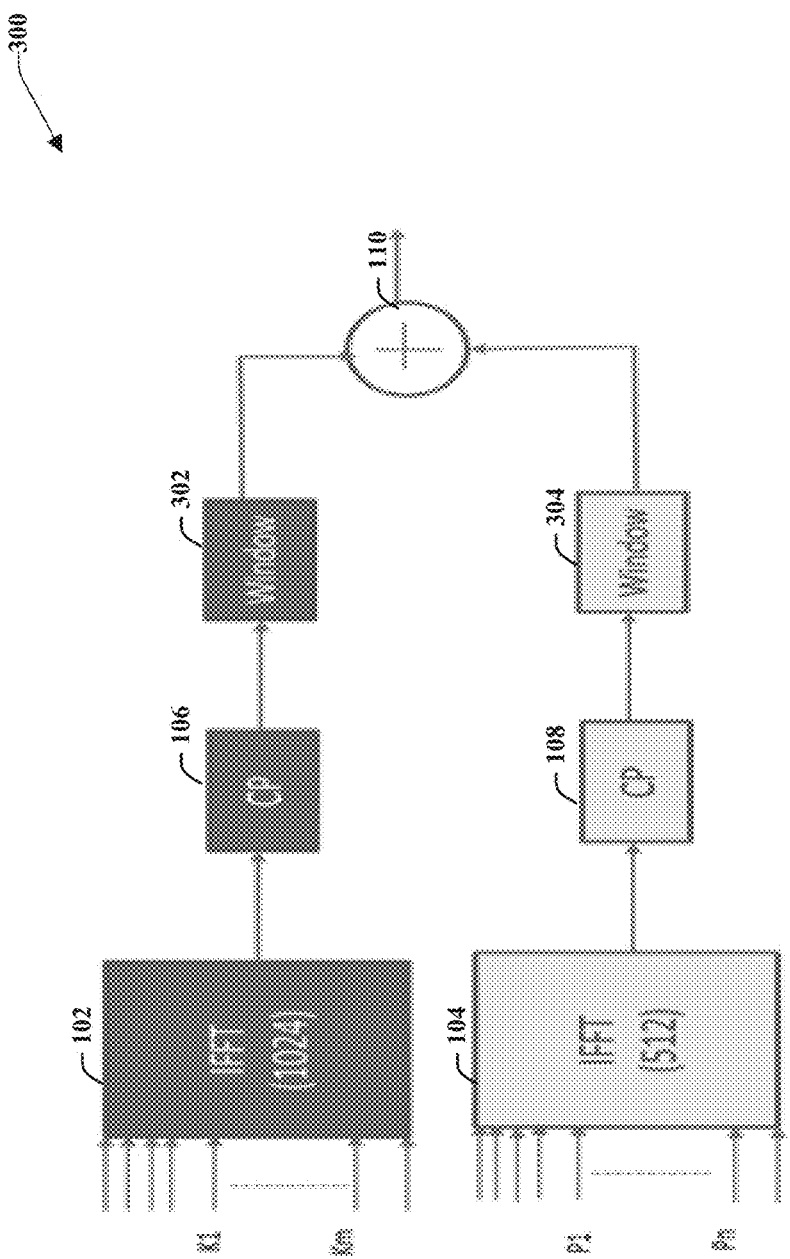
FIG. 3 illustrates an example schematic system block diagram of a windowed orthogonal frequency-division multiplexing with mixed numerology according to one or more embodiments.

Referring now to FIG. 3, illustrated is an example schematic system block diagram of a windowed orthogonal frequency-division multiplexing with mixed numerology according to one or more embodiments. FIG. 3 depicts the block diagram for windowed OFDM with mixed numerology 300. The upper branch 102 uses numerology with subcarrier spacing of 15 KHz spacing, while the lower branch 104 uses subcarrier spacing of 30 KHz. The lower branch 104 can generate two OFDM symbols during the time the upper branch 102 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 4, between the numerologies. Therefore, if G is the number of guard tones between these two numerologies, then cyclic-prefixes 106, 108 can be used to mitigate interference introduced by the upper branch 102 and the lower branch 104, respectively. Furthermore, each branch can leverage window technique blocks 302, 304 to minimize interference. The window technique blocks 302, 304 can reduce interference in the time domain of the signals received from the cyclic-prefixes 106, 108. Additionally, a summation block 110 can be used to apply the guard tones to assist in interference reduction.

Figure 4:
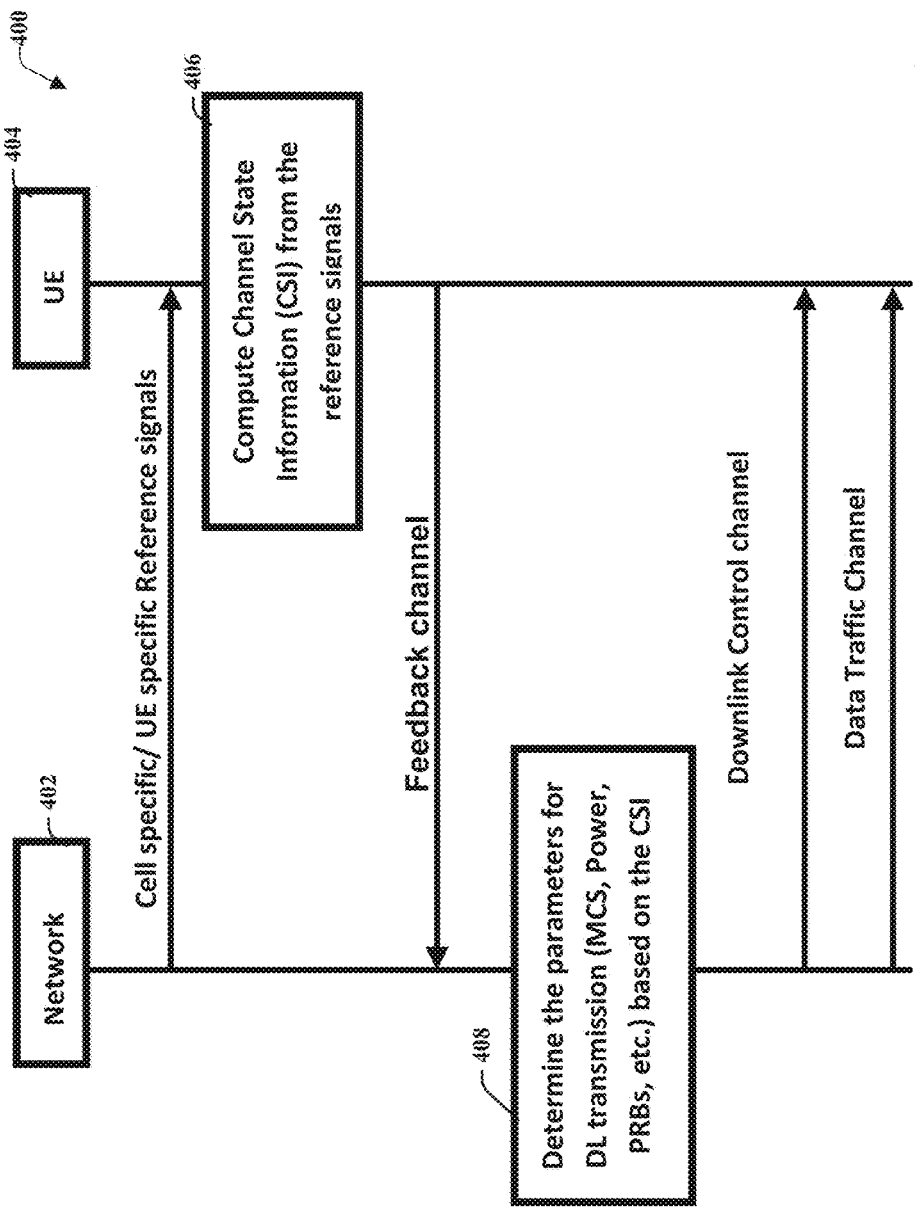
FIG. 4 illustrates an example schematic system block diagram of a message sequence chart between network and user equipment according to one or more embodiments.

Referring now to FIG. 4, illustrated is an example schematic system block diagram of a message sequence chart between network and user equipment according to one or more embodiments. FIG. 4 depicts a message sequence chart for downlink data transfer in 5G systems 400. The network device 402 can transmit reference signals to a user equipment (UE) device 404. The reference signals can be cell specific and/or user equipment device 404 specific in relation to a profile of the user equipment device 404 or some type of mobile identifier. From the reference signals, the user equipment device 404 can compute channel state information (CSI) and compute parameters needed for a CSI report at block 406. The CSI report can comprise: a channel quality indicator (CQI), a pre-coding matrix index (PMI), rank information (RI), a CSI-Resource Indicator (CRI the same as beam indicator), etc.

The user equipment device 404 can then transmit the CSI report to the network device 402 via a feedback channel either on request from the network device 402, a-periodically, and/or periodically. A network scheduler can leverage the CSI report to determine downlink transmission scheduling parameters, which are particular to the user equipment device 404. The scheduling parameters can comprise modulation and coding schemes (MCS), power, physical resource blocks (PRBs), etc. The network device 402 can then transmit the scheduling parameters to the user equipment device 404 via a downlink control channel. Thereafter and/or simultaneously, data can be transferred, via a data traffic channel, from the network device 402 to the user equipment device 404.

Figure 5:
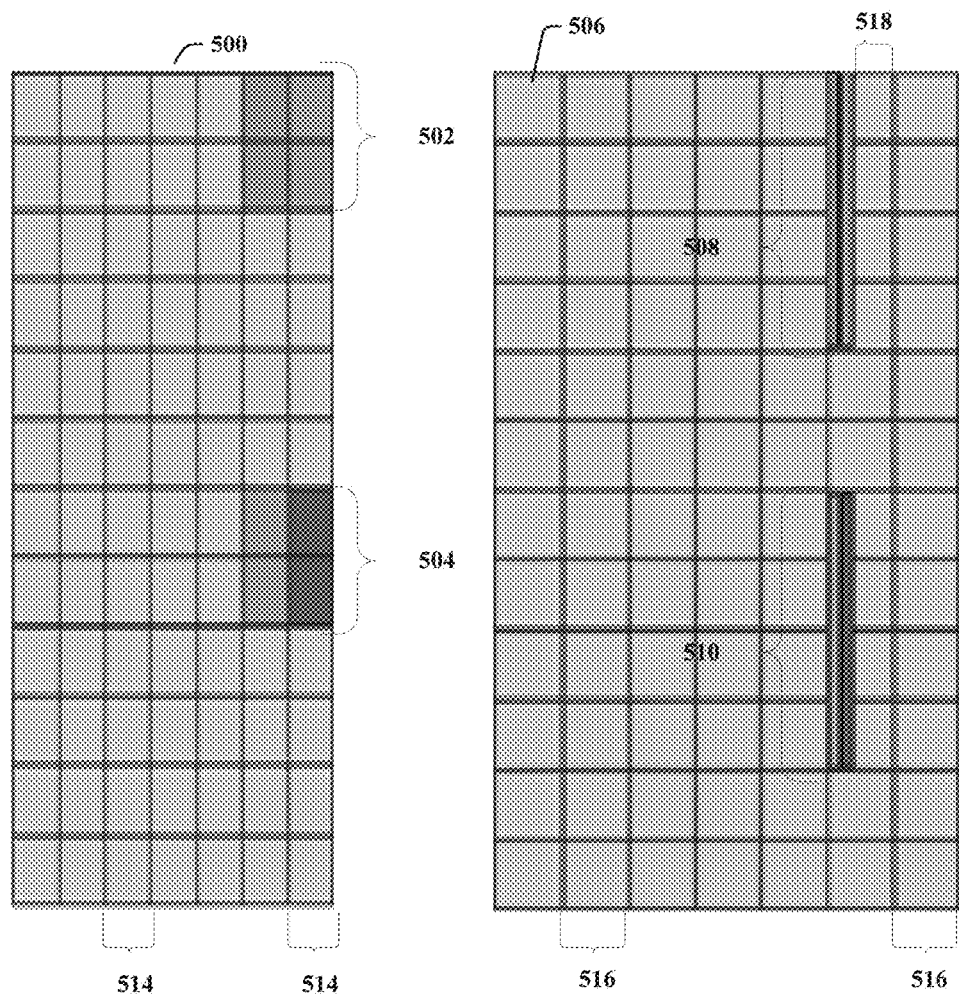
FIG. 5 illustrates an example schematic system block diagram of channel state information reference signals and physical downlink shared channel resource sharing in single numerology and in mixed numerology according to one or more embodiments.

Referring now to FIG. 5 illustrates an example schematic system block diagram of channel state information reference signals and physical downlink shared channel resource sharing in single numerology and in mixed numerology according to one or more embodiments. Single numerology orthogonal resource sharing between the CSI-RS and PDSCH can work well for LTE since LTE is a single numerology waveform. However, since the PDSCH and the CSI-RS can be related to two different user equipment devices and the numerology can be user equipment specific, the numerology used to carry the PDSCH and the CSI-RS can be different as shown in FIG. 5. For instance, for a single numerology 500, each block of the CSI-RS 502, 504 can leverage equivalent resources of the PDSCH blocks 514. However, as depicted by a mixed numerology 506, each CSI-RS 508, 510 is not equivalent to the PDSCH resource blocks 516, resulting in a portion of the PDSCH resource blocks 516 becoming wasted resources 518.

Figure 6:
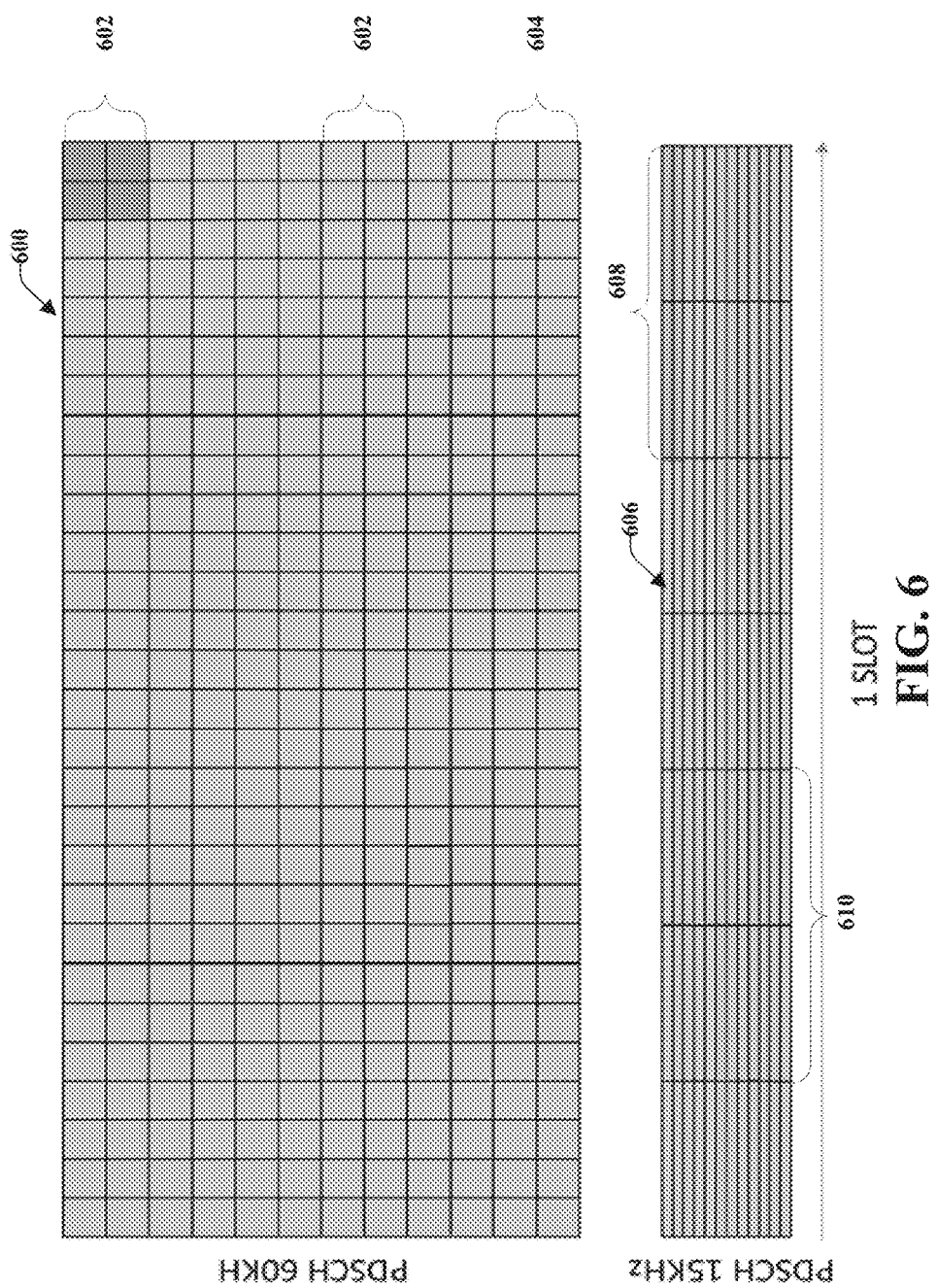
FIG. 6 illustrates an example schematic system block diagram of a mixed numerology transmission with the same channel state information reference signals numerology as physical downlink shared channel according to one or more embodiments.

Referring now to FIG. 6, illustrated is an example schematic system block diagram of a mixed numerology transmission with the same channel state information reference signal numerology as a physical downlink shared channel according to one or more embodiments. FIG. 6 depicts a mixed numerology situation where the first numerology 600 can comprise a PDSCH at 60 KHz and a second numerology 606 can comprise a PDSCH at 15 KHz. Although the numerologies are different the CSI-RS gathered resources 602, 608 can be equivalent to the PDSCH resources 604, 610 even across various numerologies. This is because the CSI-RS gather resources 602, 608 can be extended in the time domain due to the sampling frequencies. The user equipment monitoring the CSI-RS may needs to support different numerologies simultaneously, which can lead to user equipment complexity.

Figure 7:
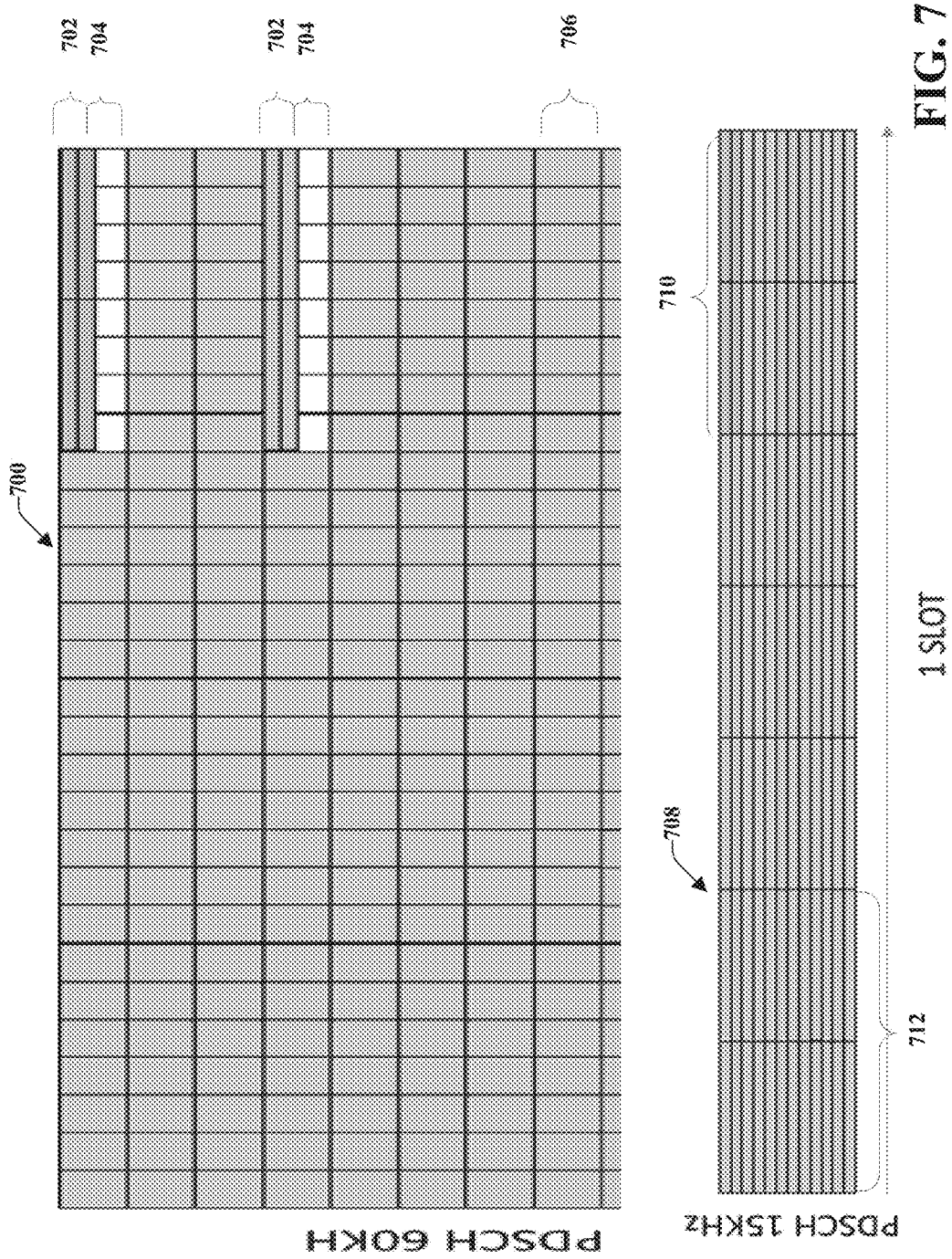
FIG. 7 illustrates an example schematic system block diagram of a 15 KHz channel state information reference signal transmission with mixed numerology according to one or more embodiments.

Referring now to FIG. 7, illustrated is an example schematic system block diagram of a 15 KHz channel state information reference signals transmission with mixed numerology according to one or more embodiments. The proposed design can support different numerologies between the CSI-RS and the underlying PDSCH. Therefore, the user equipment specific CSI-RS can be transmitted with the same numerology as what the user equipment is configured at a given instance and not require the support of different numerologies at the user equipment at any given instance. FIG. 7 depicts a specific CSI-RS with a 15 KHz numerology 708 transmitted throughout the system bandwidth irrespective of the underlying PDSCH numerology. 15 KHz numerology 708 can comprise CSI-RS 710, which is equivalent to the PDSCH resource blocks 712. Consequently, CSI-RS 702 can be used at the 60 KHz numerology 700, which is less that the standard PDSCH resource block 706. Therefore, remaining resources 704 are not unnecessarily tied up.

Figure 8:
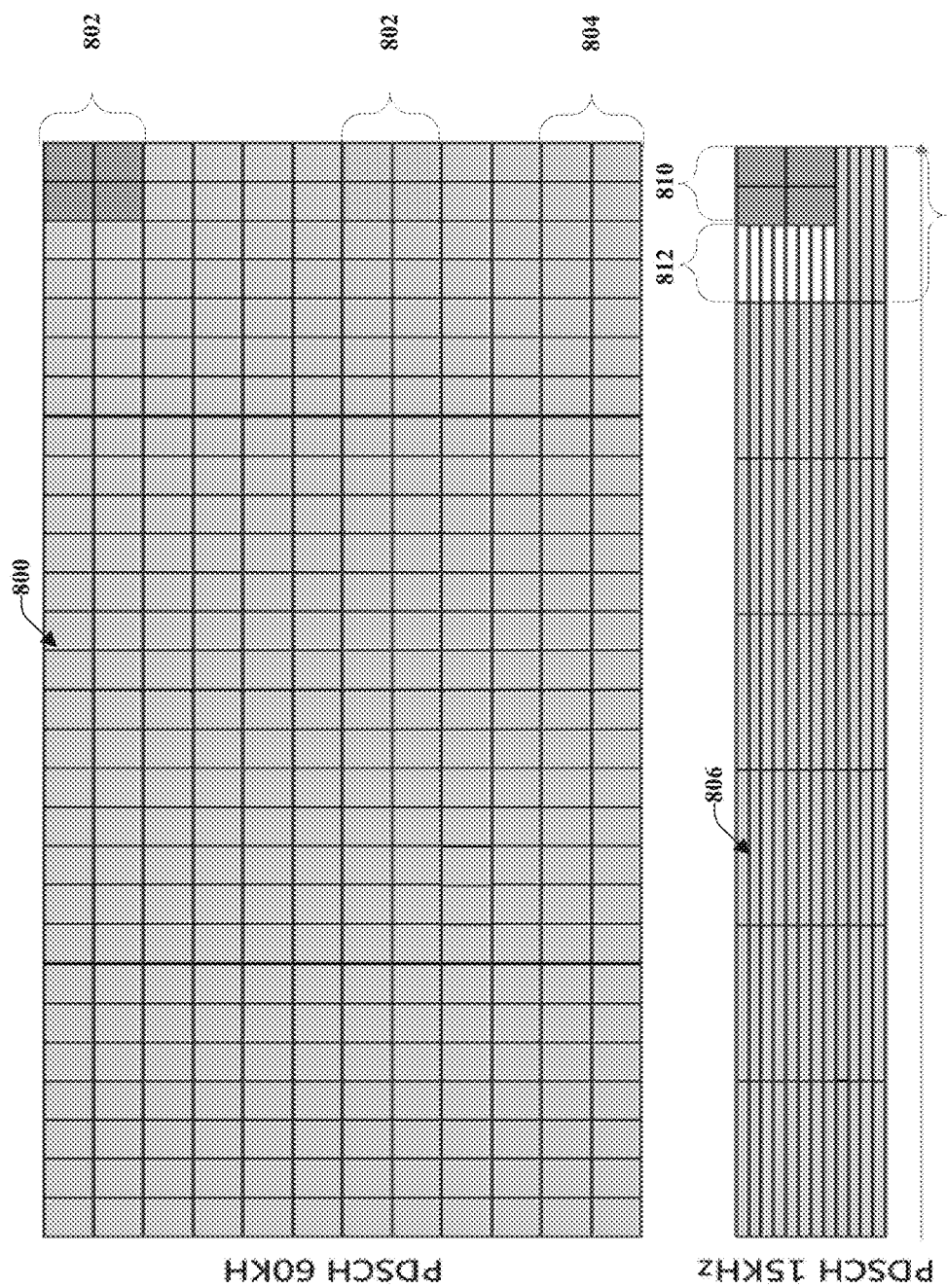
FIG. 8 illustrates an example schematic system block diagram of a 60 KHz channel state information reference signal transmission with mixed numerology according to one or more embodiments.

Referring now to FIG. 8, illustrated is an example schematic system block diagram of a 60 KHz channel state information reference signals transmission with mixed numerology according to one or more embodiments. FIG. 8 depicts a case where a user equipment specific CSI-RS with 60 KHz numerology 800 is transmitted throughout the system bandwidth irrespective of the underlying PDSCH numerology, PDSCH of 15 KHz 806. 60 KHz numerology 800 can comprise CSI-RS 802, which are equivalent to the PDSCH resource blocks 804. Consequently, CSI-RS 810 can be used at the 15 KHz numerology 806, which is less that the standard PDSCH resource block 808. Therefore, remaining resources 812 are not unnecessarily tied up because there is no transmission tying up these resources. When the numerology between the CSI-RS 810 and PDSCH 808 is different, then it is potentially difficult and perhaps in-efficient to rate match the PDSCH 808 transmission around the CSI-RS 810. Furthermore the rate matching can depend on the difference between the numerology of the PDSCH 808 and the CSI-RS 810. While rate matching the PDSCH 808 around the CSI-RS 810 is viable, additional resources need to be rate matched to reduce the interference due to the CSI-RS 810. However, if the PDSCH 808 and the CSI-RS 810 transmission overlap each other, additional efficiencies can be generated.

Figure 9:
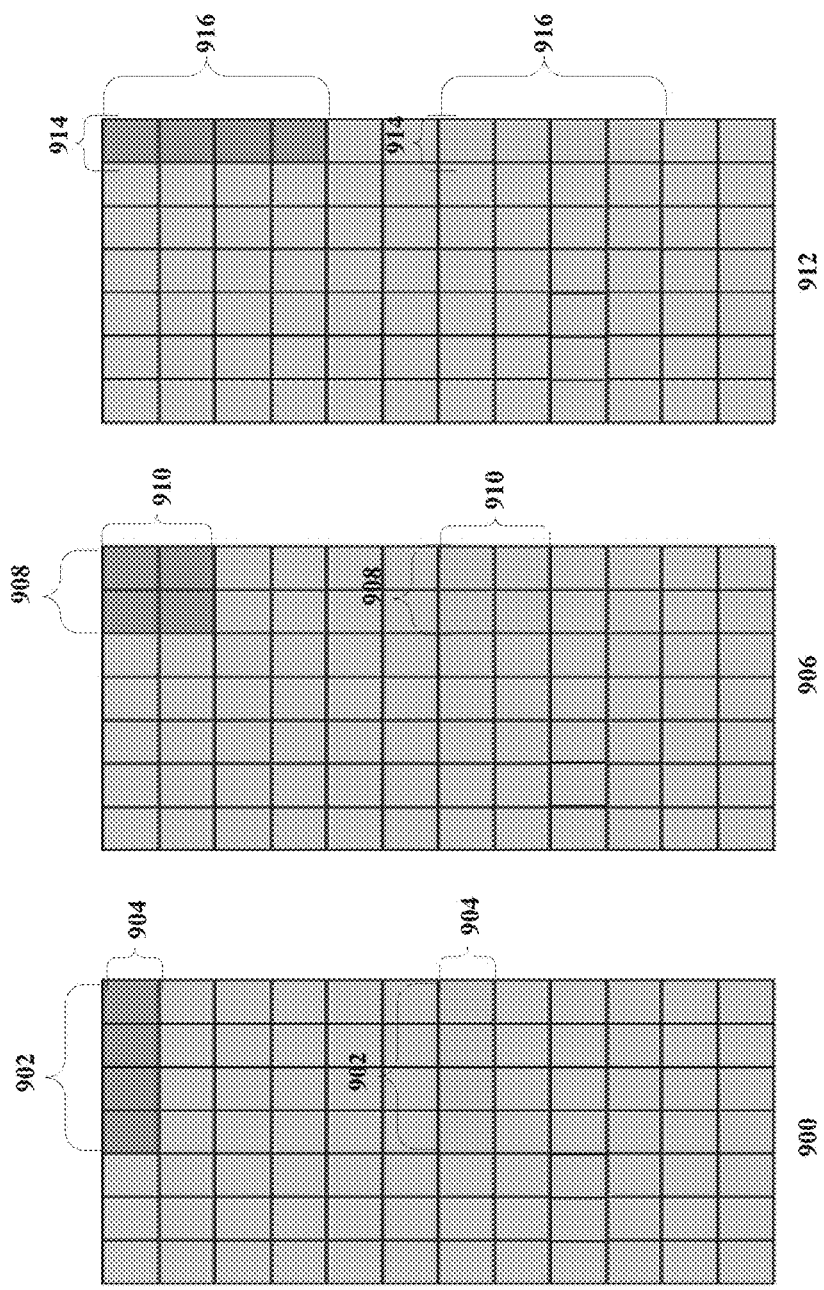
FIG. 9 illustrates an example schematic system block diagram of multiple channel state information reference signal configurations according to one or more embodiments.

Referring now to FIG. 9, illustrates an example schematic system block diagram of multiple channel state information reference signal configurations according to one or more embodiments. Because a single resource mapping may not be optimal, various CSI-RS configurations can be leveraged. With regards to a first configuration 900, the CSI-RS can use a single resource 904 in the frequency domain and multiple resources 902 in the time domain (horizontal configuration). This configuration can be used in a mixed numerology where the subcarrier spacing are in a ratio of 1:4. For example, in the case of a 15 KHz and a 60 KHz mixed numerology, this configuration can be used by the 60 KHz numerology. In this case when this configuration is placed on top of the 15 KHz numerology, it can occupies 4 subcarriers by 1 OFDM symbol. This mitigates the problem of imperfect overlap as shown in FIG. 7.

In second configuration the CSI-RS 906 can use x resources 910 in the frequency domain and x resources 908 in the time domain (square configuration). This configuration can be used in the mixed numerology case where the subcarrier spacing is in the ratio of 1:2. For example, in the case of a 60 KHz and a 120 KHz mixed numerology, this configuration can be used for the 60 KHz and 120 KHz numerology. The square configuration can mitigate the problem of imperfect overlap between the CSI-RS of one numerology and PDSCH of the other numerology.

In the third configuration 912, the CSI-RS can use multiple resources in the frequency domain 916 and a single resource in the time domain 914 (vertical configuration). This configuration can be used in a mixed numerology where the subcarrier spacing is in the ratio of 4:1. For example, in the case of a 15 KHz and a 60 KHz mixed numerology, this configuration can be used by the 15 Khz numerology. Consequently, when this configuration is placed on top of the 60 KHz numerology, it can occupy 1 subcarrier by 4 OFDM symbols. This can mitigate the problem of imperfect overlap as shown in FIG. 8. Leveraging multiple CSI-RS configurations can allow new radios to choose the proper configuration depending on the numerology mix. Additionally, a radio resource control (RRC) configuration can be associated with each CSI-RS resource.

Figure 10:
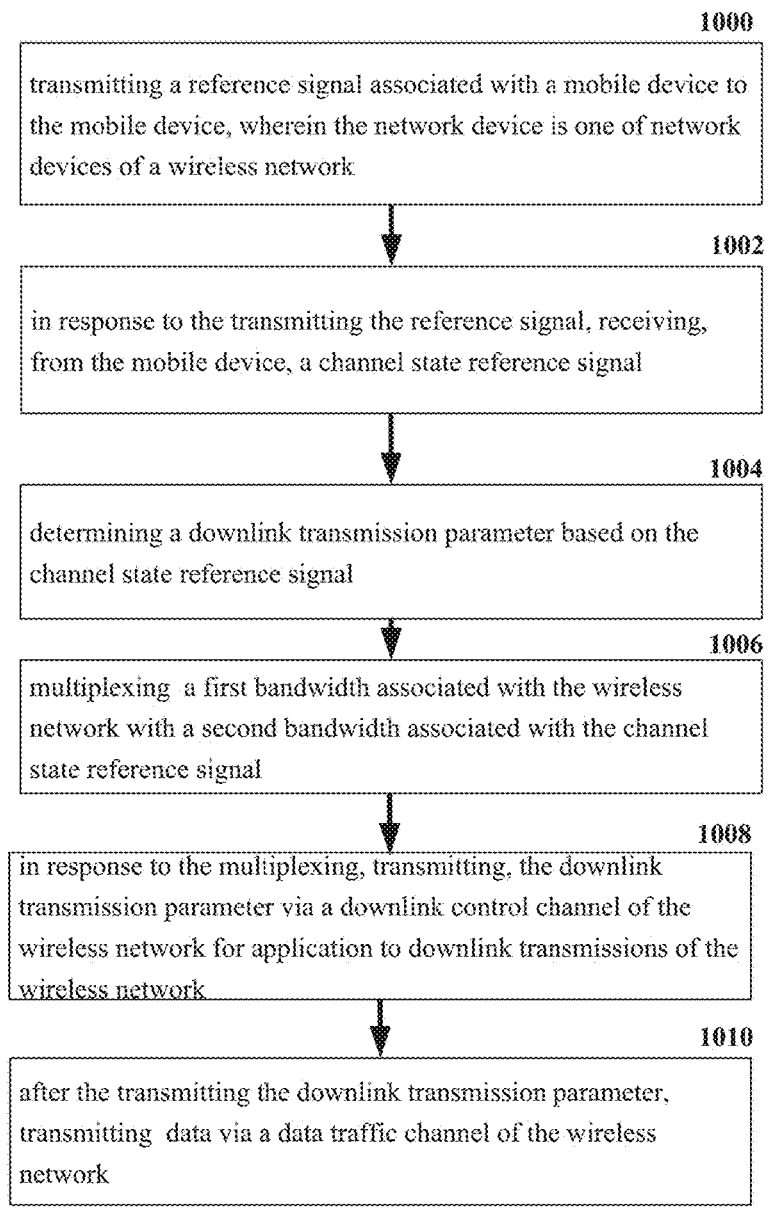
FIG. 10 illustrates an example flow diagram for generic channel state information framework design for a 5G network according to one or more embodiments.

Referring now to FIG. 10, illustrated is an example flow diagram for generic channel state information framework design for a 5G network according to one or more embodiments. At element 1000, the method can transmit, by a network device comprising a processor, a reference signal associated with a mobile device to the mobile device, wherein the network device is one of network devices of a wireless network. In response to the transmitting the reference signal, the method can comprise receiving, from the mobile device by the network device, a channel state reference signal at element 1002. Additionally, at element 1004, the method can determine, by the network device, a downlink transmission parameter based on the channel state reference signal. The method can also multiplex, by the network device, a first bandwidth associated with the wireless network with a second bandwidth associated with the channel state reference signal at element 1006. In response to the multiplexing, the method can transmit, by the network device, the downlink transmission parameter via a downlink control channel of the wireless network for application to downlink transmissions of the wireless network at element 1008. Consequently, after the transmitting the downlink transmission parameter, the method can comprise transmitting, by the network device, data via a data traffic channel of the wireless network at element 1010.

Figure 11:
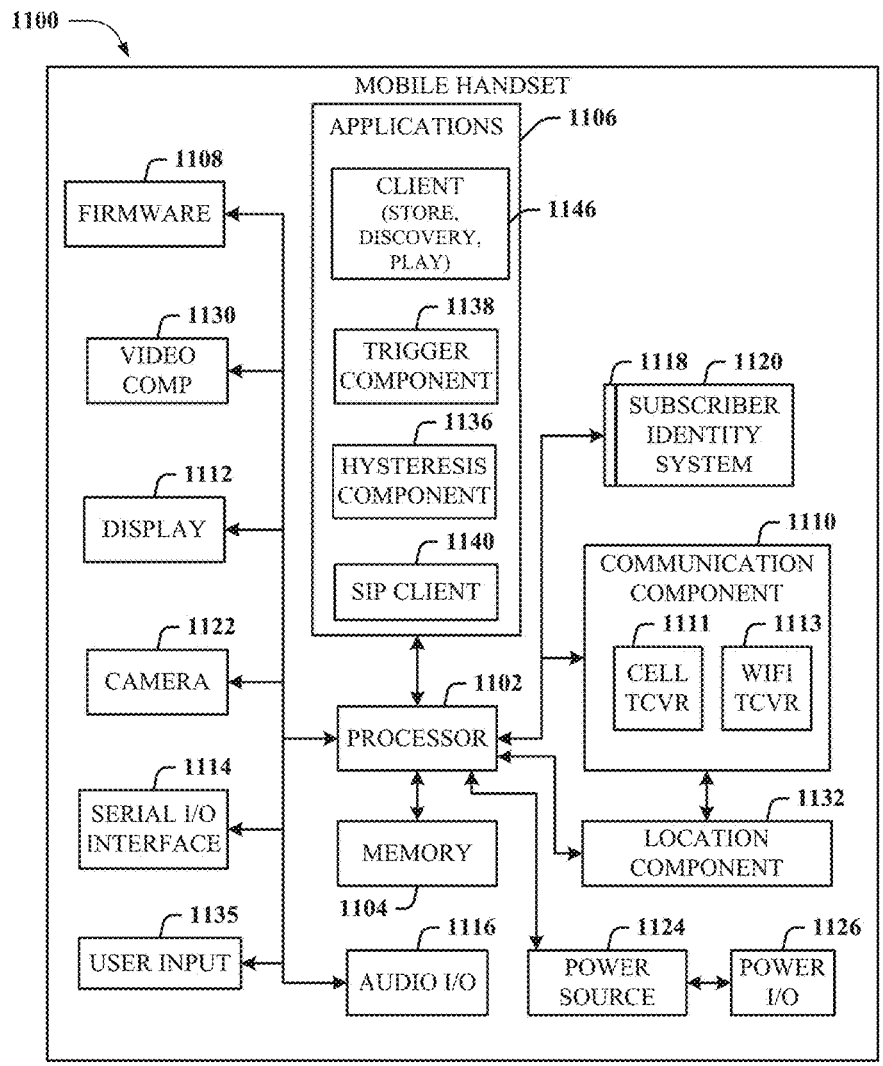
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
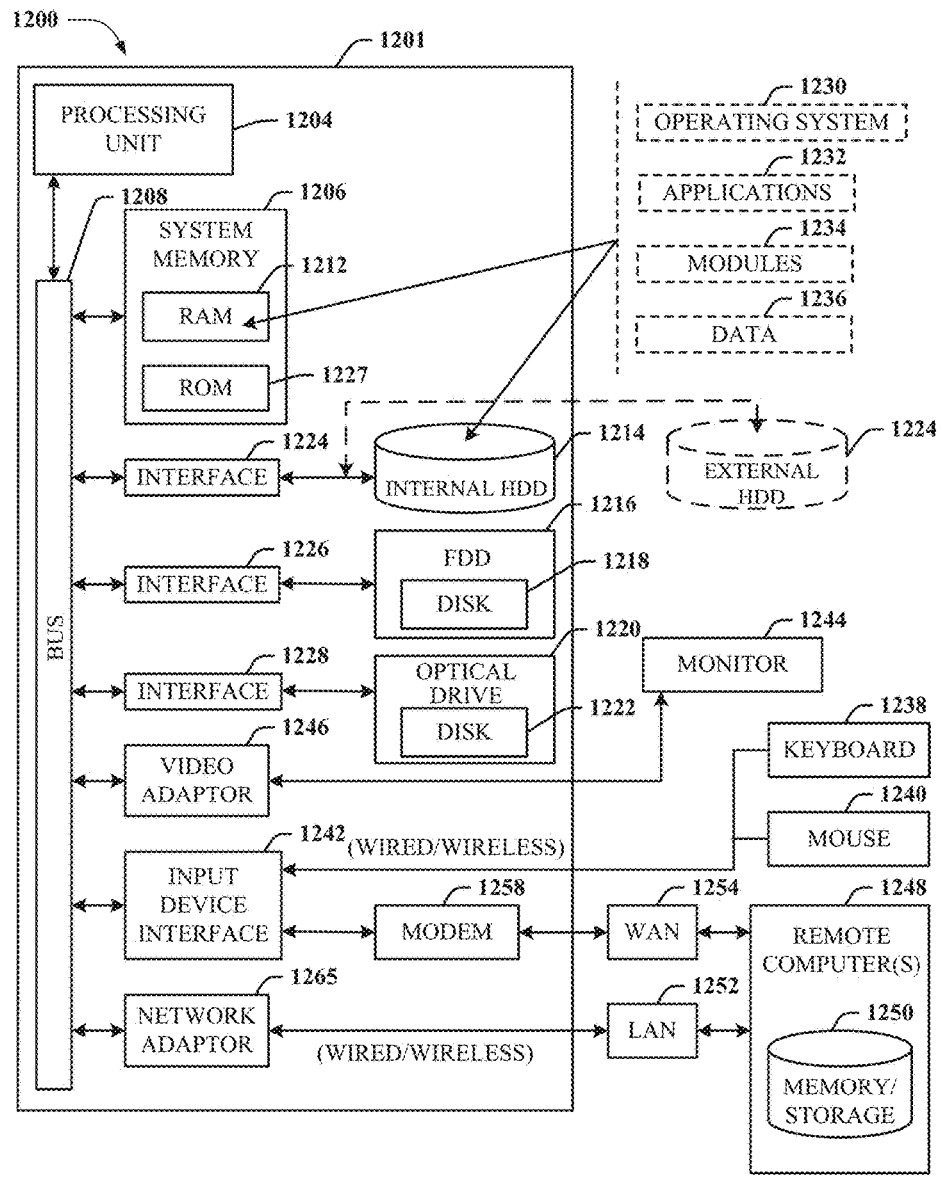
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An important aspect of 5G, which differentiates from previous 4G systems, is the use of multiple numerology. LTE systems use single numerology throughout the whole in band (i.e., within LTE bandwidth, for example 10 MHz, all the sub carriers have spacing or bandwidth of 15 KHz). However, since 5G can support various applications, single numerology as in LTE is not efficient. Hence multiple numerologies are defined to serve diverse applications. For example multiple sub carriers spacing such as 15 KHz, 30 KHz, 60 KHz, 120 KHz, 240 KHz and 480 KHz.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    transmitting, by a network device comprising a processor, a reference signal associated with a mobile device to the mobile device, wherein the network device is one of network devices of a wireless network;
    in response to the transmitting the reference signal, receiving, from the mobile device by the network device, a channel state reference signal;
    in response to the receiving the channel state reference signal, filtering, by the network device, the channel state reference signal to reduce a signal interference associated with the channel state reference signal, resulting in a filtered channel state reference signal;
    determining, by the network device, a downlink transmission parameter based on the filtered channel state reference signal;
    multiplexing, by the network device, a first bandwidth associated with the wireless network with a second bandwidth associated with the filtered channel state reference signal;
    in response to the multiplexing, transmitting, by the network device, the downlink transmission parameter via a downlink control channel of the wireless network for application to downlink transmissions of the wireless network; and
    after the transmitting the downlink transmission parameter, transmitting, by the network device, data via a data traffic channel of the wireless network.

2. The method of claim 1, further comprising:
multiplexing, by the wireless network device, the first bandwidth with the filtered channel state reference signal associated with a baseline bandwidth.

3. The method of claim 1, further comprising:
in response to decoding the first bandwidth, canceling, by the wireless network device, the channel state data associated with the second bandwidth.

4. The method of claim 3, wherein the filtered channel state reference signal comprises a channel quality indicator representative of a quality of a channel between a pair of the network devices of the wireless network.

5. The method of claim 3, wherein the filtered channel state reference signal comprises a resource indicator representative of a state of a channel between a pair of the network devices of the wireless network.

6. The method of claim 3, wherein the downlink transmission parameter comprises a power associated with the transmitting of the data.

7. The method of claim 3, wherein the downlink transmission parameter comprises a physical resource block associated with the transmitting of the data.

8. A network device, comprising:
a processor; and
a memory that stores executable instructions that, when executed by the processor, facilitate performance of operations, comprising:
transmitting a reference signal related to a mobile device to the mobile device via a network device of network devices of a wireless network;
in response to the transmitting of the reference signal, receiving channel state data, via a feedback channel, from the mobile device via the network device;
in response to the receiving the channel state data, filtering the channel state data to reduce a signal interference associated with the channel state data, resulting in filtered channel state data;
determining a downlink transmission parameter based on the filtered channel state data;
transmitting the downlink transmission parameter via a downlink control channel of the wireless network for application to downlink transmissions of the wireless network; and
in response to the transmitting of the downlink transmission parameter, transmitting data via a data traffic channel of the wireless network.

9. The network device of claim 8, wherein the data comprises a physical downlink shared channel.

10. The network device of claim 9, wherein the filtered channel state data comprises channel state data associated with a reference signal.

11. The network device of claim 10, wherein the operations further comprise:
multiplexing a physical downlink shared channel with the reference signal associated the filtered channel state data.

12. The network device of claim 11, wherein the operations further comprise:
in response to the multiplexing, canceling an the signal interference associated with the reference signal associated with the filtered channel state data.

13. The network device of claim 12, wherein the operations further comprise:
reducing a power of the reference signal associated with the filtered channel state data of an interfering bandwidth.

14. The network device of claim 9, wherein the receiving the channel state data results in a reception, wherein the transmitting the downlink transmission parameter results in a transmission, and wherein the reception overlaps the transmission.

15. A non-transitory machine-readable storage medium, comprising executable instructions that, when executed by a processor, facilitate performance of operations, comprising:
sending a reference signal associated with a mobile device to the mobile device;
in response to the sending the reference signal, receiving channel state data, via a feedback channel, from the mobile device;
in response to the receiving the channel state data, filtering a signal associated with the channel state data to reduce an interference associated with the signal;
based on the channel state data, determining a downlink transmission parameter;
transmitting the downlink transmission parameter via a downlink control channel to be used for downlink transmissions via the downlink control channel; and
in response to the transmitting the downlink transmission parameter, transmitting data via a data traffic channel used for data transmissions.

16. The non-transitory machine-readable storage medium of claim 15, wherein the downlink transmission parameter comprises a modulation and coding parameter associated with the transmitting the data.

17. The non-transitory machine-readable storage medium of claim 16, wherein the operations further comprise:
based on a bandwidth associated with channel state data of a reference signal, matching a physical downlink shared channel to the channel state data of the reference signal.

18. The non-transitory machine-readable storage medium of claim 15, wherein the receiving the channel state data is concurrent with the transmitting the downlink transmission parameters.

19. The non-transitory machine-readable storage medium of claim 18, wherein the operations further comprise:
multiplexing a first signal of a physical downlink shared channel with the reference signal associated the channel state data.

20. The non-transitory machine-readable storage medium of claim 19, wherein the multiplexing comprises combining the first signal with the reference signal.

* * * * *